(12) United States Patent
Fritsch et al.

(10) Patent No.: US 12,427,003 B2
(45) Date of Patent: Sep. 30, 2025

(54) ARTIFICIAL ANTERIOR TOOTH FOR NATURALISTIC APPEARANCE

(71) Applicant: DENTSPLY SIRONA Inc., York, PA (US)

(72) Inventors: Brian D. Fritsch, Columbia, PA (US); Robert Karl Stupplebeen, Webster, NY (US); Erik Russell Jacobs, York, PA (US); Edward Joseph Kuchinski, Willow Street, PA (US); Michael Christopher Sabino, Cockeysville, MD (US)

(73) Assignee: Dentsply Sirona Inc., York, PA (US)

( * ) Notice: Subject to any disclaimer, the term of this patent is extended or adjusted under 35 U.S.C. 154(b) by 423 days.

(21) Appl. No.: 17/960,229

(22) Filed: Oct. 5, 2022

(65) Prior Publication Data

US 2023/0346526 A1    Nov. 2, 2023

Related U.S. Application Data

(60) Provisional application No. 63/335,871, filed on Apr. 28, 2022.

(51) Int. Cl.
*A61C 13/08* (2006.01)
*A61C 13/00* (2006.01)

(52) U.S. Cl.
CPC ........ *A61C 13/082* (2013.01); *A61C 13/0004* (2013.01)

(58) Field of Classification Search
CPC . A61C 13/0006; A61C 13/081; A61C 13/082; A61C 13/087; A61C 13/09; A61C 13/0004; A61C 13/0019
See application file for complete search history.

(56) References Cited

U.S. PATENT DOCUMENTS

| 3,218,711 | A | 11/1965 | Connan |
| 3,449,832 | A | 6/1969 | Connan |
| 2013/0221554 | A1* | 8/2013 | Jung ............... A61C 13/083 264/16 |
| 2022/0000592 | A1* | 1/2022 | Ramirez ............ G06T 19/20 |

FOREIGN PATENT DOCUMENTS

WO    2023211484    11/2023

OTHER PUBLICATIONS

"International Application Serial No. PCT US2022 045745, International Search Report mailed Jan. 23, 2023", 3 pgs.
"International Application Serial No. PCT US2022 045745, Written Opinion mailed Jan. 23, 2023", 6 pgs.

* cited by examiner

*Primary Examiner* — Eric J Rosen
*Assistant Examiner* — Sydney J Pulvidente
(74) *Attorney, Agent, or Firm* — SCHWEGMAN LUNDBERG & WOESSNER, P.A.

(57) ABSTRACT

An artificial anterior tooth having a more naturalistic or lifelike appearance for use in the design and/or production of a dental prosthesis and/or dental restoration is provided. The lingual-facing surface of an artificial anterior tooth is provided with a plurality of furrows in predetermined locations on the lingual-facing surface to correspond with a plurality of furrows on the labial-facing surface in predetermined locations on the labial-facing surface, so as to impart variable, lifelike color and/or translucency properties throughout the tooth.

18 Claims, 9 Drawing Sheets

ARTIFICIAL ANTERIOR TOOTH FOR NATURALISTIC APPEARANCE

CROSS-REFERENCE TO RELATED APPLICATIONS

This application claims the benefit of and priority to U.S. Provisional Application No. 63/335,871 filed Apr. 28, 2022, which is herein incorporated by reference for all purposes.

FIELD OF THE INVENTION

The present invention relates to an improved artificial tooth and/or set of artificial teeth for use in the design and/or production of a dental prosthesis (e.g., partial or full denture) and/or dental restoration (e.g., crown or bridge). More particularly, the invention relates to an anterior artificial tooth and/or set of artificial anterior teeth having predetermined features for providing a more naturalistic or lifelike appearance in a dental prosthesis and/or dental restoration.

BACKGROUND

In the field of prosthodontics, those who design or produce dental prostheses (such as partial or full dentures) and/or dental restorations (such as crowns or bridges) seek to provide replacement or restorative dentition that is both functionally robust and reliable, as well as visually appealing and consistent in appearance with that of natural teeth.

While many materials and manufacturing methods have been developed over the years to address improved functional performance of artificial teeth, one of the key issues or challenges still encountered with current artificial teeth is difference in visible appearance when compared to natural teeth. The typical visibly exposed dental crown portion of natural teeth (clinical crown) in the oral cavity is composed of an exterior hard enamel layer adjoining and surrounding a softer inner core of dentin having a microstructure network of thousands of very small (about 1-5 microns in diameter) dentinal tubules (small tubes filled with tissue fluid) traversing through the dentin. This multi-layered structure thus affects both the mechanical strength and optical properties of natural teeth. The anterior teeth (central incisors, lateral incisors, and canines/cuspids), due to their central prominence and greater exterior visibility (e.g., when smiling) at the opening of the mouth relative to that of posterior teeth (premolars, molars), are particularly subject to heightened attention or discrimination of their appearance, more so than that of posterior teeth.

Conventional artificial anterior teeth are customarily provided with substantially uniform cross-sectional thicknesses, ensuring consistent strength across the width of the tooth so as to avoid undesirable tooth fracture or fragmentation failure. Thus, when an artificial anterior tooth is made of a single, uniform material, its appearance is limited to a very uniform, invariable, and less lifelike color and/or opacity/translucency impression that is less natural-looking. This may occur with an artificial anterior tooth formed from a single polymeric material, composite material, or ceramic/glass-ceramic material through conventional molding, casting, or subtractive manufacturing techniques (e.g., CNC machining). Even with more recent advancements in additive or generative manufacturing techniques (e.g., three-dimensional (3D) printing or volumetric printing), this less natural-looking appearance also still remains a significant challenge for artificial teeth formed of single, homogeneous material feedstocks or compositions. Alternatively, while it has been known to use multi-layered compositional materials to address some of the aforementioned limitations associated with single, homogeneous materials, such multi-layered materials typically have additional technical challenges with higher manufacturing complexity and costs, making them more difficult to produce and/or more limiting to "premium" dental markets and niche/specialty restorative applications.

Therefore, there remains a need for an improved, more natural-looking artificial anterior tooth possessing variable, lifelike color and/or opacity/translucency properties throughout the tooth, for use in dental prostheses and/or dental restorations. In particular, it is especially desirable to be able to achieve a natural-looking, more lifelike artificial anterior tooth regardless of the type of material(s) or manufacturing method(s) employed to produce it.

SUMMARY

Disclosed are embodiments for an artificial tooth and/or set of artificial teeth that satisfy these and other needs for use in the design and/or production of a dental prosthesis (e.g., partial or full denture) and/or dental restoration (e.g., crown or bridge).

An artificial anterior tooth of the present invention may comprise:
(a) a labial-facing surface having at least one first furrow ($F_1$), disposed left of a mid-sagittal plane of the labial-facing surface, and at least one second furrow ($F_2$), disposed right of the mid-sagittal plane of the labial-facing surface, where each of the at least one first and the at least one second furrows ($F_1$ and $F_2$) extend across at least a portion of a clinical crown on the labial-facing surface in the cervico-incisal direction; and
(b) a lingual-facing surface having at least one third furrow ($F_3$), disposed left of a mid-sagittal plane of the lingual-facing surface, and at least one fourth furrow ($F_4$), disposed right of the mid-sagittal plane of the lingual-facing surface, where each of the at least one third and the at least one fourth furrows ($F_3$ and $F_4$) extend across at least a portion of a clinical crown on the lingual-facing surface in the cervico-incisal direction;
wherein:
the location of at least one of the at least one third furrow ($F_3$) across the mesiodistal direction on the lingual-facing surface substantially corresponds with the location of at least one of the at least one first furrow ($F_1$) across the mesiodistal direction on the labial-facing surface; and the location of at least one of the at least one fourth furrow ($F_4$) across the mesiodistal direction on the lingual-facing surface substantially corresponds with the location of at least one of the at least one second furrow ($F_2$) across the mesiodistal direction on the labial-facing surface.

In one aspect of the present invention, each of the at least one first and the at least one second furrows ($F_1$ and $F_2$) may extend across at least about 20 percent of the clinical crown on the labial-facing surface in the cervico-incisal direction, proximate to an incisal end. In another aspect, each of the at least one third and the at least one fourth furrows ($F_3$ and $F_4$) may extend across at least about 20 percent of the clinical crown on the lingual-facing surface in the cervico-incisal direction, proximate to an incisal end.

In yet another aspect of the present invention, for the portion of the labial-facing surface and the portion of the lingual-facing surface over which each of the furrows extend, at least one mesiodistal cross-sectional area of the artificial anterior tooth may have: (i) an overall maximal thickness dimension ($Th_{max}$); and (ii) a plurality of narrowed (e.g., reduced) thickness (e.g., thinner) sections each having a minimal thickness dimension ($Th_{min}$), corresponding to the mesiodistal locations of the furrows; where a ratio of the overall maximal thickness dimension to the minimal thickness dimension ($Th_{max}/Th_{min}$) may be at least about 1.15, and no more than about 2.50.

In still another aspect, the average maximal width of each of the furrows ($FW_{max}$) may be at least about 5 percent, and no more than about 40 percent, of the artificial anterior tooth maximal width ($W_{max}$).

In an embodiment, an artificial anterior tooth of the present invention may be in the form of a virtual three-dimensional (3D) model in a non-transitory computer-readable storage medium.

In another embodiment, an artificial anterior tooth of the present invention may be comprised of a polymeric composition, a composite resin composition, a ceramic composition, a glass-ceramic composition, or any combinations thereof. In one aspect, the polymeric composition, the composite resin composition, the ceramic composition, the glass-ceramic composition, or any combinations thereof may have a substantially uniform composition distribution throughout the artificial anterior tooth. Alternatively, the polymeric composition, the composite resin composition, the ceramic composition, the glass-ceramic composition, or any combinations thereof may have a non-uniform composition distribution across at least a portion of the artificial anterior tooth. The non-uniform composition distribution may be configured in a graduated or multi-layered formation across at least a portion of the artificial anterior tooth.

In embodiments of an artificial anterior tooth having a non-uniform composition distribution, the non-uniform composition, distribution may be configured such that for a 1.0±0.2 mm thickness sample of the artificial anterior tooth, $L^*_{(cervical)} < L^*_{(incisal)}$, where $L^*_{(cervical)}$ is a CIE (D65) lightness value measured proximate to a cervical end of the artificial anterior tooth, and $L^*_{(incisal)}$ is a CIE (D65) lightness value measured proximate town incisal end of the artificial anterior tooth. Alternatively, or additionally, the non-uniform composition distribution may be configured such that for a 1.0±0.2 mm thickness sample of the artificial anterior tooth, $\% T_{(cervical)} < \% T_{(incisal)}$, where $\% T_{(cervical)}$ is a % Total Transmittance value measured proximate to a cervical end of the artificial anterior tooth, and $\% T_{(incisal)}$ is a % Total Transmittance value measured proximate to an incisal end of the artificial anterior tooth.

A set of artificial anterior teeth may be comprised of a plurality of artificial anterior teeth as set forth in any of the aforementioned embodiments or any other embodiments provided in the present disclosure.

BRIEF DESCRIPTION OF THE DRAWINGS

These and other features, aspects, exemplary embodiments, and advantages of the present invention will become better understood with regard to the following description, appended claims, and accompanying drawings where:

DETAILED DESCRIPTION

Figure 1A:
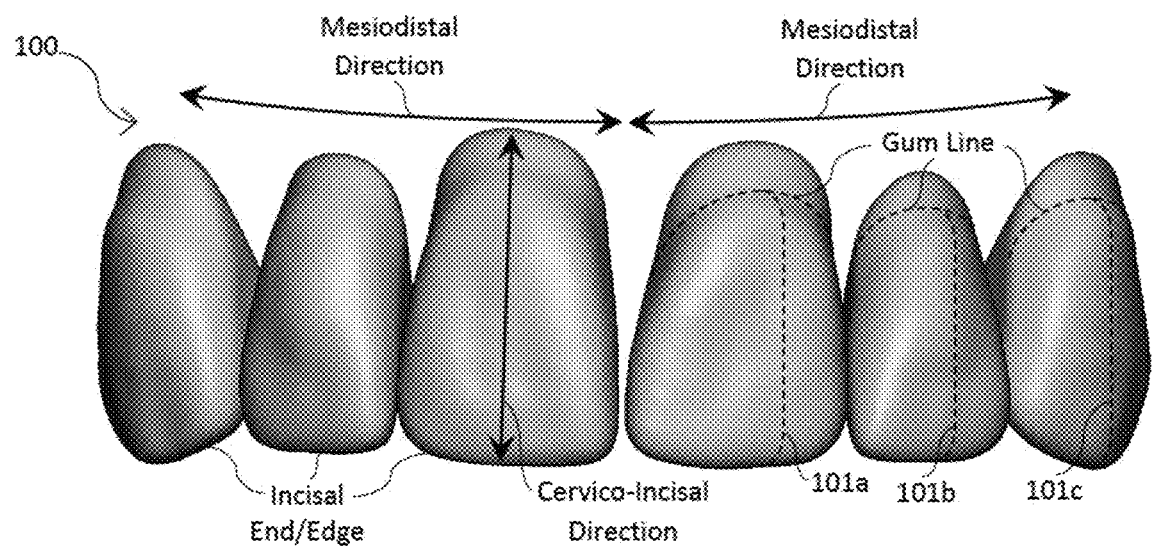
FIG. 1A shows an example image of a virtual three-dimensional (3D) model of a complete set of conventional upper (maxillary) artificial anterior teeth, from the viewpoint of the labial-facing side, where the labial-facing surfaces of the anterior teeth have not been modified according to embodiments of the present disclosure.

In the Summary above, and in the Detailed Description and Claims presented below, along with the accompanying drawings, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The following definitions shall apply throughout the specification and claims of the invention, unless specifically indicated otherwise.

The terms "about," "essentially," and "substantially" as used herein are intended as terms of approximation to have a broad meaning in agreement with the common and accepted usage by those of ordinary skill in the art for the subject matter of this disclosure. It should be understood that these terms are intended to allow description of certain features or characteristics described and claimed without restricting the scope of these features or characteristics to the precise numerical value provided. Thus, these terms should be interpreted as indicating that insubstantial or inconsequential modifications or alterations of the subject matter described and claimed are considered to be within the scope of the invention as recited in the claims. Accordingly, the terms "essentially" and "substantially" are used herein as terms of approximation to denote in large part, but not necessarily wholly or perfectly, in relation to the fundamental nature or predominant characteristic being described. Additionally, the term "about" should be understood to mean that the relevant value, quantity, or parameter is not and need not be exact, but may be approximate and/or larger or smaller reflecting tolerances, rounding off, intrinsic measurement accuracy and/or measurement error known to those skilled in the art. For the sake of additional clarity, the term "about" may be further understood to mean within no more than plus or minus 5 percent of the indicated value, preferably within no more than plus or minus 3 percent of the indicated value, more preferably within no more than plus or minus 1 percent of the indicated value.

The term "at least" followed by a number or numerical description is used herein to denote the start of a range beginning with that number (which may be a range having an upper limit or no upper limit, depending on the variable being defined). For example, "at least 1" means 1 or more than 1.

The terms "at most" or "no more than" followed by a number or numerical description is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)-(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items: as well as the lack of combination when interpreted in the alternative ("or"). For example, "A and/or B" means A alone, B alone, or A and B together or mixtures thereof.

Directional or spatially relative terms, such as "under," "below," "beneath," "lower," "over," "upper," "above," "on top," "left," "right," and the like, may be used herein for ease of description to describe the relationship of an element or feature to other element(s) or feature(s) illustrated in the figures. It will be understood that the spatially relative terms are intended to encompass different orientations of the device in addition to the orientations depicted in the figures. For example, if the device in the figures were to be inverted, elements or features described as "above" or "on top" other elements or features would then be oriented "below" or "under" the other elements or features. The device may be otherwise oriented (e.g., rotated at 90 degrees or other orientations) and the spatially relative descriptors used herein interpreted accordingly. Similarly, the terms "upward," "downward," "vertical," "horizontal" and the like are used herein for the purpose of relative explanation only, unless specifically indicated otherwise.

The term "furrow" is used herein to describe a narrow groovelike or trenchlike depression formed or cut into a surface of an artificial tooth.

The term "mid-sagittal" or "median" plane (or, alternatively, line) is used herein to describe the sagittal or longitudinal plane (or line) running through the midline or center of an artificial tooth form, vertically splitting the artificial tooth form into two substantially equal halves.

The term "labial-facing" is used herein to describe the surface area of an artificial tooth that would face outwardly from an oral cavity toward the lips.

The term "lingual-facing" is used herein to describe the surface area of an artificial tooth that would face inwardly toward an oral cavity, on the side closest or nearest to the tongue.

The term "clinical crown" is used herein to refer to the portion of an artificial anterior tooth that is visible above the gumline, extending from the incisal end or edge to the free gingival margin area, either in the oral cavity or that of an artificial gingival margin area of a denture base.

The term "cervico-incisal" is used herein to refer to the direction along the line of an anterior tooth from the incisal end or edge to the cervical region, or the length orientation of an anterior tooth.

The term "mesiodistal" or "mesial-distal" is used herein to refer to the direction along the line of a dental arch, or the width orientation of an anterior tooth.

Artificial Anterior Tooth

FIG. 1A shows an example image (100) of a virtual three-dimensional (3D) model of a complete set of conventional upper (maxillary) artificial anterior teeth, from the viewpoint of the labial-facing side, where the labial-facing surfaces of the anterior teeth have not been modified according to embodiments of the present disclosure. This image is presented to aid in description and reference comparisons to various features and embodiments of the present disclosure. In this image, the mesiodistal direction, cervico-incisal direction, incisal/end/edge, and gum line are shown, as well as the corresponding clinical crowns (indicated as 101a, 101b, 101c) on a central incisor, lateral incisor, and canine/cuspid.

Figure 1B:
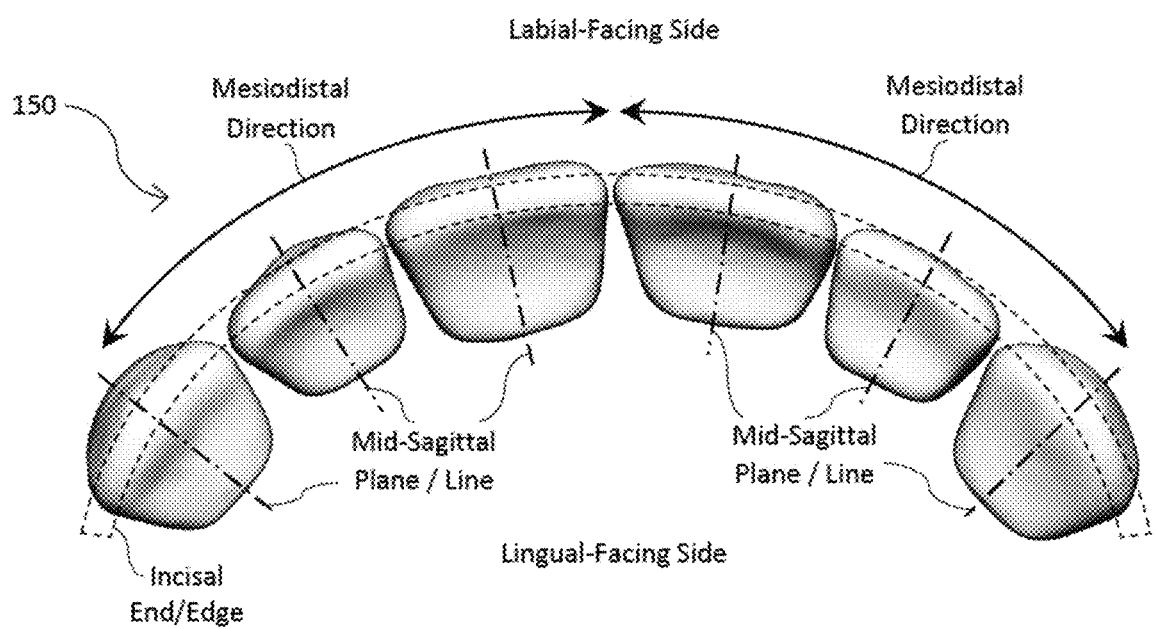
FIG. 1B shows an example image of a virtual three-dimensional (3D) model of a complete set of conventional upper (maxillary) artificial anterior teeth, from the viewpoint of the lingual-facing side and incisal end/edge, where the labial-facing and lingual-facing surfaces of the anterior teeth have not been modified according to embodiments of the present disclosure.

FIG. 1B shows an example image (150) of a virtual three-dimensional (3D) model of a complete set of conventional upper (maxillary) artificial anterior teeth, from the viewpoint of the lingual-facing side and incisal end/edge, where the labial-facing and lingual-facing surfaces of the anterior teeth have not been modified according to embodiments of the present disclosure. Here, too, this image is presented to aid in description and reference comparisons to various and embodiments of the present disclosure. In this image, the mesiodistal direction, incisal end/edge, and mid-sagittal plane/line for each of the anterior teeth are shown.

Figure 2A:
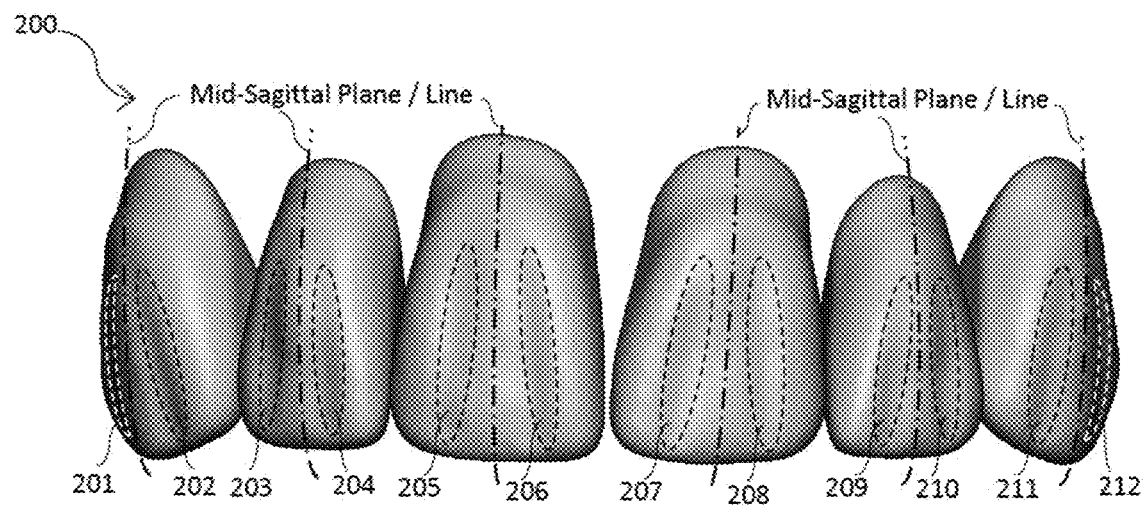
FIG. 2A shows an example image of a virtual three-dimensional (3D) model of a complete set of upper (maxillary) artificial anterior teeth, from the viewpoint of the labial-facing side, for an embodiment of the present disclosure.
Figure 3A:
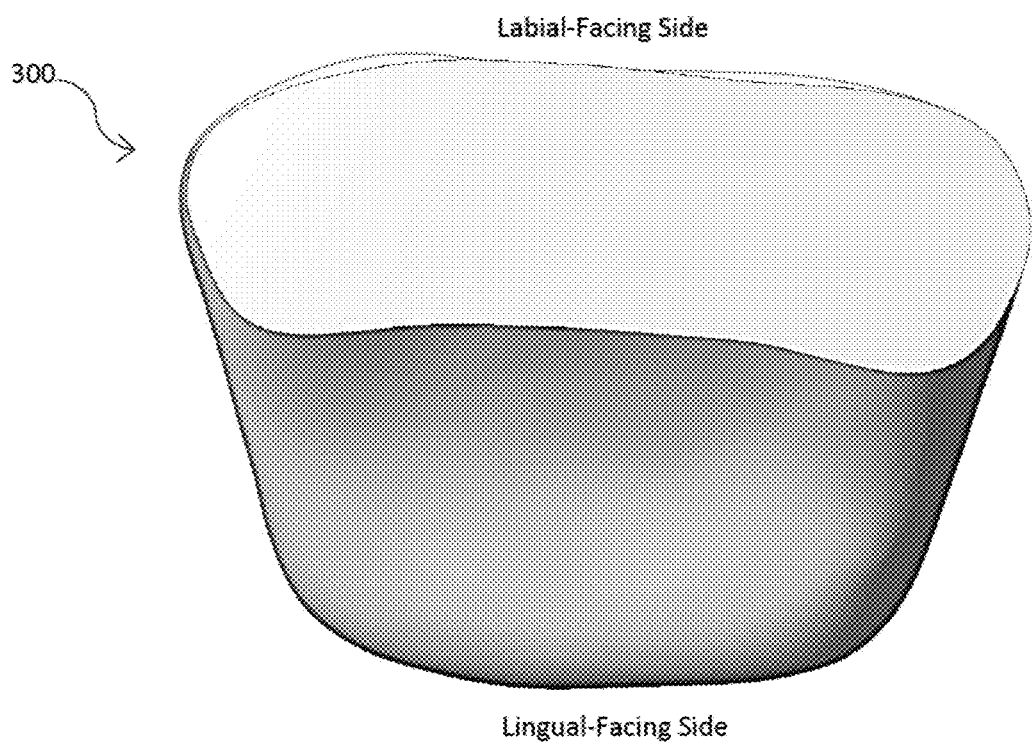
FIG. 3A shows an example image for a mesiodistal cross-sectional area view of a virtual three-dimensional (3D) model of a conventional upper (maxillary) artificial central incisor tooth, from the viewpoint of the lingual-facing side and incisal end/edge, where the labial-facing surface and lingual-facing surface of the central incisor tooth have not been modified according to embodiments of the present disclosure.
Figure 3B:
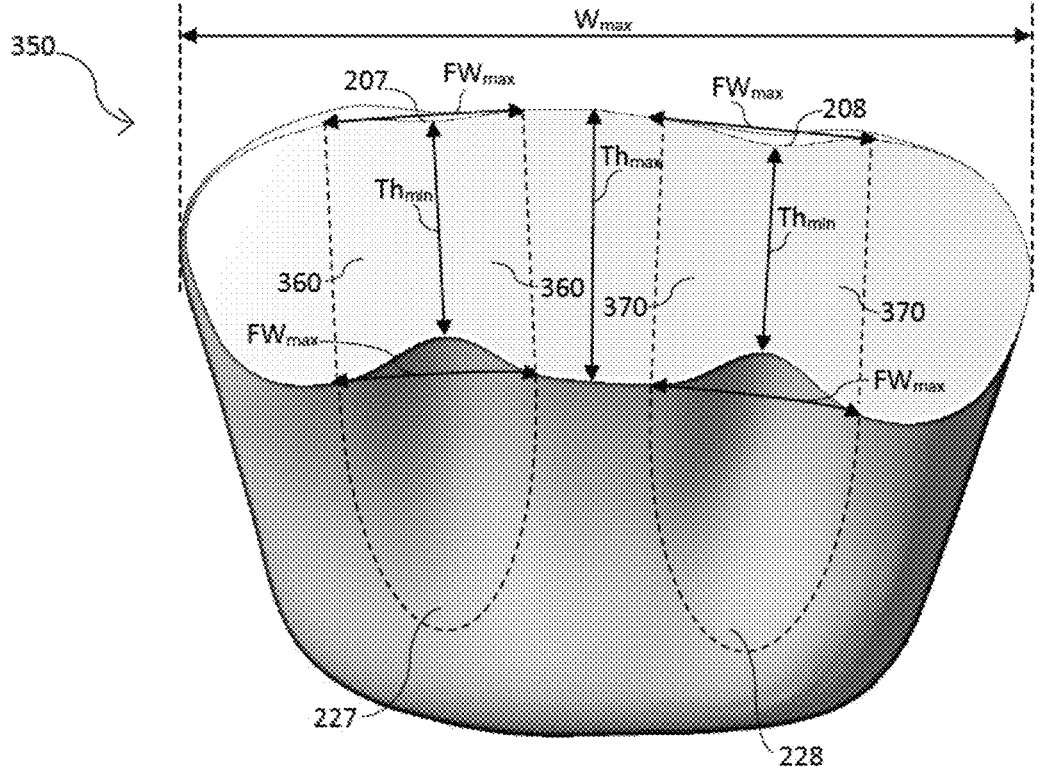
FIG. 3B shows an example image for a mesiodistal cross-sectional area view of a virtual three-dimensional (3D) model of an upper (maxillary) artificial central incisor tooth, from the viewpoint of the lingual-facing side and incisal end/edge, for an embodiment of the present disclosure.
Figure 4A:
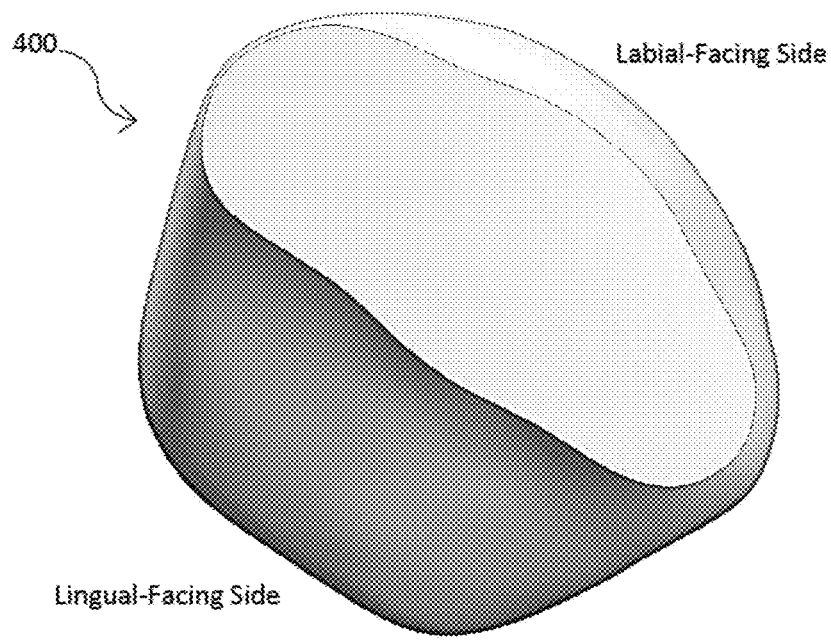
FIG. 4A shows an example image for a mesiodistal cross-sectional area view of a virtual three-dimensional (3D) model of a conventional upper (maxillary) artificial canine/cuspid tooth, from the viewpoint of the lingual-facing side and incisal end/edge, where the labial-facing surface and lingual-facing surface of the canine/cuspid tooth have not been modified according to embodiments of the present disclosure.
Figure 4B:
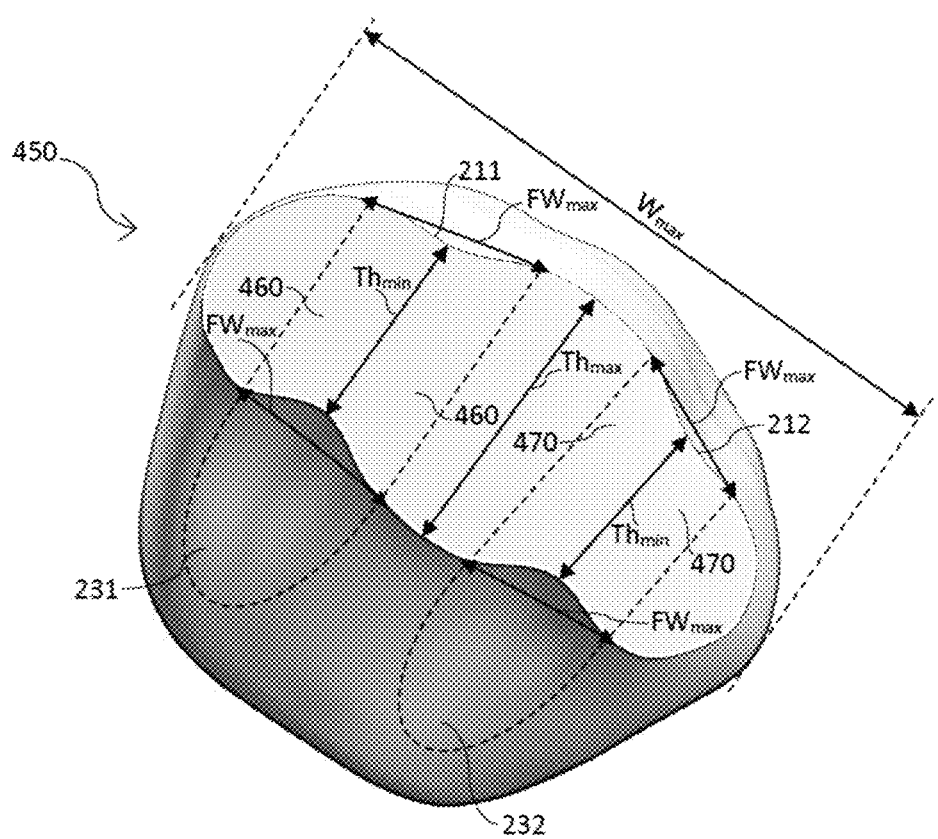
FIG. 4B shows an example image for a mesiodistal cross-sectional area view of a virtual three-dimensional (3D) model of an upper (maxillary) artificial canine/cuspid tooth, from the viewpoint of the lingual-facing side and incisal end/edge, for an embodiment of the present disclosure.
Figure 5A:
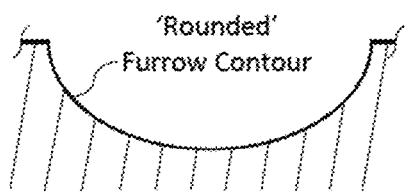
FIG. 5A shows a first representative, non-limiting example for a mesiodistal cross-sectional contour of a furrow (i.e., the cross-sectional profile or shape of the furrow itself) that may be beneficial to incorporate in embodiments of the present disclosure.
Figure 5B:
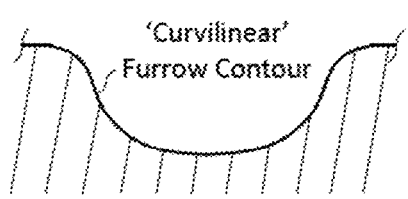
FIG. 5B shows a second representative, non-limiting example for a mesiodistal cross-sectional contour of a furrow (i.e., the cross-sectional profile or shape of the furrow itself) that may be beneficial to incorporate in embodiments of the present disclosure.
Figure 5C:
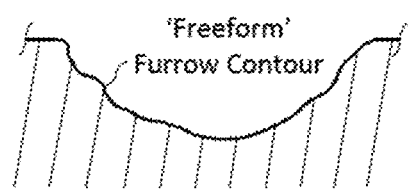
FIG. 5C shows a third representative, non-limiting example for a mesiodistal cross-sectional contour of a furrow (i.e., the cross-sectional profile or shape of the furrow itself) that may be beneficial to incorporate in embodiments of the present disclosure.
Figure 5D:
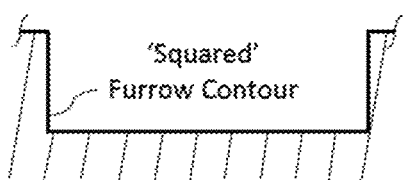
FIG. 5D shows a fourth representative, non-limiting example for a mesiodistal cross-sectional contour of a furrow (i.e., the cross-sectional profile or shape of the furrow itself) that may be beneficial to incorporate in embodiments of the present disclosure.
Figure 5E:
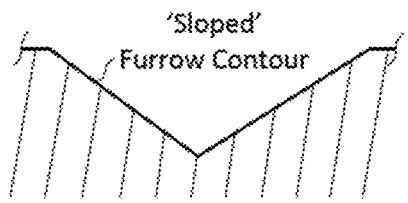
FIG. 5E shows a fifth representative, non-limiting example for a mesiodistal cross-sectional contour of a furrow (i.e., the cross-sectional profile or shape of the furrow itself) that may be beneficial to incorporate in embodiments of the present disclosure.
Figure 5F:
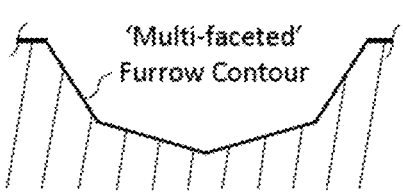
FIG. 5F shows a sixth representative, non-limiting example for a mesiodistal cross-sectional contour of a furrow (i.e., the cross-sectional profile or shape of the furrow itself) that may be beneficial to incorporate in embodiments of the present disclosure.

FIG. 2A shows an example image (200) of a virtual three-dimensional (3D) model of a complete set of upper (maxillary) artificial anterior teeth, from the viewpoint of the labial-facing side, for an embodiment of the present disclosure, where the labial-facing surfaces may each have a first furrow, $F_1$ (outlined as 201, 203, 205, 207, 209, 211), disposed left of a mid-sagittal plane (or line) of the labial-facing surfaces, and a second furrow, $F_2$ (outlined 202, 204, 206, 208, 210, 212), disposed right of a mid-sagittal plane (or line) of the labial-facing surfaces. Furthermore, each of the at least one first and the at least one second furrows ($F_1$ and $F_2$) may extend across at least a portion of a clinical crown on the labial-facing surface in the cervico-incisal direction. FIG. 3A, 3B shows cross sections 300, 350 of clinical crowns. FIGS. 4A and 4B show additional cross sections 400, 450 of clinical crowns.

Figure 2B:
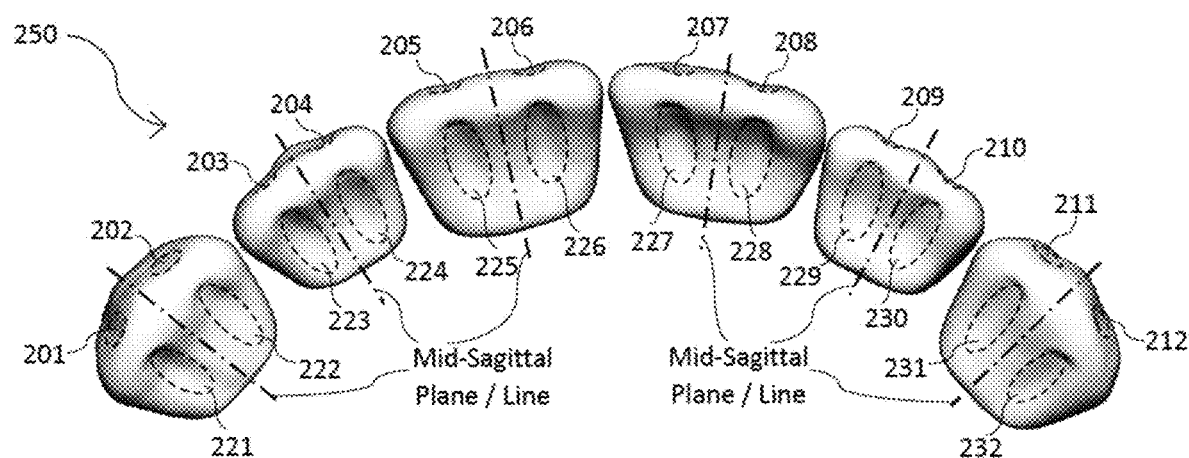
FIG. 2B shows an example image of a virtual three-dimensional (3D) model of a complete set of upper (maxillary) artificial anterior teeth, from the viewpoint of the lingual-facing side and incisal end/edge, for an embodiment of the present disclosure.

FIG. 2B shows an example image (250) of a virtual three-dimensional (3D) model of a complete set of upper (maxillary) artificial anterior teeth for an embodiment of the present disclosure, from the viewpoint of the lingual-facing side and incisal end/edge, where the lingual-facing surfaces may each have a third furrow, $F_3$ (outlined as 221, 223, 225, 227, 229, 231), disposed left of a mid-sagittal plane (or line) of the lingual-facing surfaces, and a fourth furrow, $F_4$ (outlined as 222, 224, 226, 228, 230, 232), disposed right of a mid-sagittal plane (or line) of the lingual-facing surfaces. Furthermore, each of the at least one third and the at least one fourth furrows ($F_3$ and $F_4$) may extend across at least a portion of a clinical crown on the lingual-facing surface in the cervico-incisal direction.

Additionally, it should also be appreciated from the embodiments cited in FIG. 2A and FIG. 2B that the location of at least one of the at least one third furrow ($F_3$) and the location of at least one of the at least one fourth furrow ($F_4$) across the mesiodistal direction on the lingual-facing surface may substantially correspond with the location of at least one of the at least one first furrow ($F_1$) and the location of at least one of the at least one second furrow ($F_2$) across the mesiodistal direction on the labial-facing surface, respectively. More specifically: the location of at least one of the at least one third furrow ($F_3$) across the mesiodistal direction on the lingual-facing surface may substantially correspond with the location of at least one of the at least one first furrow ($F_1$) across the mesiodistal direction on the labial-facing surface; and the location of at least one of the at least one fourth furrow ($F_4$) across the mesiodistal direction on the lingual-facing surface may substantially correspond with the location of at least one of the at least one second furrow ($F_2$) across the mesiodistal direction on the labial-facing surface. In another aspect, the locations of each of the at least one third furrow ($F_3$) across the mesiodistal direction on the lingual-facing surface may substantially correspond with the locations of each of the at least one first furrow ($F_1$) across the mesiodistal direction on the labial-facing surface; and the locations of each of the at least one fourth furrow ($F_4$) across the mesiodistal direction on the lingual-facing surface may substantially correspond with the locations of each of the at least one second furrow ($F_2$) across the mesiodistal direction on the labial-facing surface.

Without intending to be limiting, in one embodiment the at least one first furrow ($F_1$) may be a single furrow disposed left of a mid-sagittal plane of the labial-facing surface, and the at least one second furrow ($F_2$) may be a single furrow disposed right of a mid-sagittal plane of the labial-facing surface. These first and second furrows ($F_1$ and $F_2$) have been discovered to be advantageous in establishing natural-looking structural alterations or features for varying surface area on the tooth in a predetermined manner to improve the extent of interaction with incoming or ambient light (especially light scattering and light reflection). Thus, in another embodiment, the formation of two or more first furrows ($F_1$) disposed left of a mid-sagittal plane of the labial-facing surface, and two or more second furrows ($F_2$) disposed right of a mid-sagittal plane of the labial-facing surface, may be further beneficial. Providing multiple furrows on either side of the tooth center in a predetermined manner may be useful for further regulating the extent of interaction with incoming or ambient light. In either of these cases regardless of number, it may be preferable, though not necessary, for an equal number of the first furrow(s) ($F_1$) and the second furrow(s) ($F_2$) to be present on the labial-facing surface. Furthermore, although the location(s) of the first furrow(s) ($F_1$) and the second furrow(s) ($F_2$) may be arranged left and right, respectively, of the mid-sagittal plane, the specific mesiodistal location(s) of each of the furrows within the left and right halves of the labial-facing surface need not be particularly limited. However, in one embodiment, it may be preferable for the sake of creating visual balance or symmetry to have the first furrow(s) ($F_1$) and the second furrow(s) ($F_2$) each located essentially at or about the center of each of the left and right halves of the tooth, respectively, in the mesiodistal direction, Turning to the lingual-facing surface of an anterior tooth, similar to that of the labial-facing surface, in one embodiment the at least one third furrow ($F_3$) may be a single furrow disposed left of a mid-sagittal plane of the lingual-facing surface, and the at least one fourth furrow ($F_4$) may be a single furrow disposed right of a mid-sagittal plane of the lingual-facing surface. Alternatively, in another embodiment, the formation of two or more third furrows ($F_3$) disposed left of a mid-sagittal plane of the lingual-facing surface, and two or more fourth furrows ($F_4$) disposed right of a mid-sagittal plane of the lingual-facing surface, may be advantageous. For either case, it may be preferable for the number of furrows on the lingual-facing surface to substantially correspond with the number of furrows on the labial-facing surface. Likewise, it may be preferable for the mesiodistal locations of the furrows on the lingual-facing surface to substantially correspond with the mesiodistal locations of the furrows on the labial-facing surface.

Preferred lengths of the furrows may be predetermined and/or adjusted, for example, to better suit the desired clinical crown shape or size for a specific anterior tooth (central incisor, lateral incisor, canine/cuspid). Moreover, preferred lengths may be predetermined and/or adjusted to achieve the desired degree of interaction with incoming light, taking into additional consideration the inherent optical properties (e.g., opacity, color) associated with specific material(s) selected for forming the teeth. Thus, in one embodiment, each of the at least one first and the at least one second furrows ($F_1$ and $F_2$) may extend across at least about 20 percent of the clinical crown on the labial-facing surface in the cervico-incisal direction, proximate to an incisal end. In more preferred embodiments, each of the at least one first and the at least one second furrows ($F_1$ and $F_2$) may extend across at least about 25 percent, or at least about 30 percent, or at least about 35 percent, or at least about 40 percent, of the clinical crown on the labial-facing surface in the cervico-incisal direction, proximate to an incisal end. The at least one first and the at least one second furrows ($F_1$ and $F_2$) may extend across substantially the entire length of the clinical crown on the labial-facing surface in the cervico-incisal direction. In another embodiment, each of the at least one third and the at least one fourth furrows ($F_3$ and $F_4$) may extend across at least about 20 percent of the clinical crown on the lingual-facing surface in the cervico-incisal direction, proximate to an incisal end. In more preferred embodiments, each of the at least one third and the at least one fourth furrows ($F_3$ and $F_4$) may extend across at least about 25 percent, or at least about 30 percent, or at least about 35 percent, or at least about 40 percent, of the clinical crown on the lingual-facing surface in the cervico-incisal direction, proximate to an incisal end. The at least one third and the at least one fourth furrows ($F_3$ and $F_4$) may extend across substantially the entire length of the clinical crown on the lingual-facing surface in the cervico-incisal direction.

In another embodiment, the substantial correspondence of mesiodistal locations of the third and fourth furrows ($F_3$ and $F_4$) on the lingual-facing surface with the first and second furrows ($F_1$ and $F_2$) on the labial-facing surface (see for example FIG. 2B, FIG. 3B, and FIG. 4B) has been found to be particularly advantageous in the creation and regulation of predetermined localized 'higher translucency zones' ('HT zones') (areas 360, 370 in FIG. 3B; 460, 470 in FIG. 4B) in an anterior tooth. These 'higher translucency zones' ('HT zones') are associated with the comparatively thinner or more narrow cross-sectional area of these localized zones (i.e., relative to the cross-sectional area outside of these zones) within an anterior tooth. An anterior tooth possessing these localized 'HT zones' has been found effective to enable increased light transmittance effects, across and through the tooth form. Desirable variations and/or gradations in translucency/opacity and radiance or luster across the tooth can be created and adjusted, by regulating the width and thickness/depth of these localized 'HT zones' to better suit the variety of available tooth materials. Rather unexpectedly, though, creation of these localized 'HT zones' can further confer a desirable and complementary benefit of assorted color value changes or shifts across a tooth, introduced by the additional constructive interaction of altered light absorption and light scattering intensities in these zones (refer to Examples section and FIG. 8A-8C). This is particularly advantageous when manifested in anterior tooth forms made with single, homogeneous materials or compositions. Also quite surprisingly, contrary to initial concerns and expectations, the inventors have discovered that despite creation of these comparatively thinner or more narrow cross-sectional areas in these localized zones, an anterior tooth of the present invention is nonetheless capable of providing a sufficiently robust structure without jeopardizing manufacturability and/or fracture resistance integrity in dental prostheses.

Thus, in a preferred embodiment, the artificial anterior tooth may comprise at least one mesiodistal cross-sectional area, for the portion of the labial-facing surface and the portion of the lingual-facing surface over which each of the furrows extend, where the mesiodistal cross-sectional area has: (i) an overall maximal thickness dimension ($Th_{max}$) (refer to FIG. 3B and FIG. 4B, for example), and (ii) a plurality of narrowed (e.g., reduced) thickness (e.g., thinner) sections each having a minimal thickness dimension ($Th_{min}$) (refer again to FIG. 3B and FIG. 4B, for example), corresponding to the mesiodistal locations of the furrows, where a ratio of the overall maximal thickness dimension to the minimal thickness dimension ($Th_{max}/Th_{min}$) is at least about 1.15, and no more than about 2.50. In still other preferred embodiments, the ratio of the overall maximal thickness dimension to the minimal thickness dimension ($Th_{max}/Th_{min}$) is at least about 1.20, or at least about 1.25, and no more than about 2.40, or no more than about 2.30. Furthermore, the furrows on the lingual-facing surface and on the labial-facing surface may be substantially equivalent in depth, or may have different depths. In one embodiment, it may be advantageous for each of the third and fourth furrows ($F_3$ and $F_4$) to have a greater (larger) depth on the lingual-facing surface in comparison to depths for each of the first and second furrows ($F_1$ and $F_2$) on the labial-facing surface. Thus, in another preferred embodiment, the ratio of depths of the third and fourth furrows ($F_3$, and $F_4$) to the depths of the first and second furrows ($F_1$ and $F_2$) may be at least about 1.25, and no more than about 4.00. In still other preferred embodiments, the ratio of depths of the third and fourth furrows ($F_3$ and $F_4$) to the depths of the first and second furrows ($F_1$ and $F_2$) may be at least about 1.50, or at least about 1.75, and no more than about 3.50, or no more than about 3.00. At least one advantage of providing a depth ratio such as this may be to allow for a greater degree or range of control over the intensity of localized 'HT zones' formed, without the need to impose very deep (and potentially less natural-looking) furrows on the labial-facing surface. Additionally, when taking into consideration the eventual selection of tooth material, manufacturing process capabilities (e.g., accuracy or precision limits), and possible post-processing handling or treatment (e.g., polishing, surface coating/sealing), it may be advantageous to further increase or decrease the preferred thickness ratio (or depth ratio) of these furrows, within the aforementioned limits, to account for such factors in obtaining the most desirable end results.

In another embodiment, it may be preferable for the average maximal width of each of the furrows ($FW_{max}$) to be at least about 5 percent, and no more than about 40 percent, of the artificial anterior tooth maximal width ($W_{max}$) (see FIG. 3B and FIG. 4B, for example). Moreover, it may be preferable for the average maximal width of each of the furrows ($FW_{max}$) to be at least about 10 percent, or at least about 15 percent, and no more than about 35 percent, or no more than about 30 percent of the artificial anterior tooth maximal width ($W_{max}$).

FIG. 5A-5F show representative, non-limiting examples for mesiodistal cross-sectional contours of furrows that may be beneficial to further modify or refine the naturalistic appearance and/or light interaction effects of the artificial anterior tooth. In particular, here the influence of light reflection (i.e., light bouncing off rather than through an object's surface), both specular reflection and diffuse reflection effects, on perceived appearance attributes of an artificial tooth may be further regulated. With specular reflection, light reflects at the same angle as it hits the surface of a very smooth, flat surface having little or no surface variations (e.g., a highly polished metal, glass, or stationary liquid surface). With diffuse reflection, light reflects in many directions or angles as it hits the surface of a coarse/rough or distorted surface having more features or variations (e.g., surface rippling or waves on water). Thus, alterations in the magnitude or extent of any surface concavity or convexity present, as well as the amount or frequency of surface angle changes created, may be directed to better controlling or balancing these visual effects. Therefore, without intending to be limiting, in another embodiment the mesiodistal cross-sectional contour of each of the furrows (i.e., the cross-sectional profile or shape of the furrow itself) may be rounded (see FIG. 5A). curvilinear (see FIG. 5B), freeform (see FIG. 5C), squared (see FIG. 5D), sloped (see FIG. 5E). multi-faceted (see FIG. 5F), or any combinations thereof.

Figure 6A:
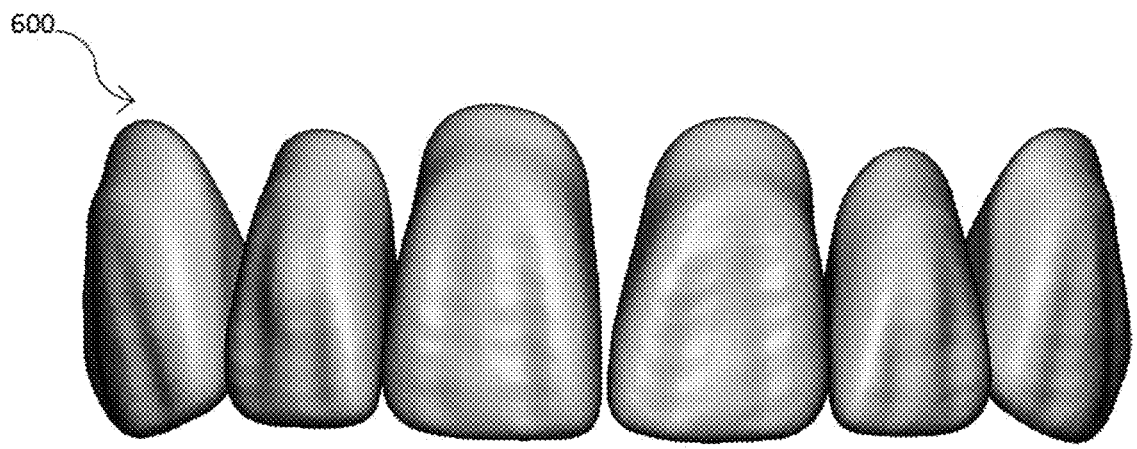
FIG. 6A shows an example image of a virtual three-dimensional (3D) model of a complete set of upper (maxillary) artificial anterior teeth, from the viewpoint of the labial-facing side, for an alternative embodiment of the present disclosure, where the surface area within each of the at least one first and the at least one second furrows ($F_1$ and $F_2$) has been further modified to incorporate additional surface variation.
Figure 6B:
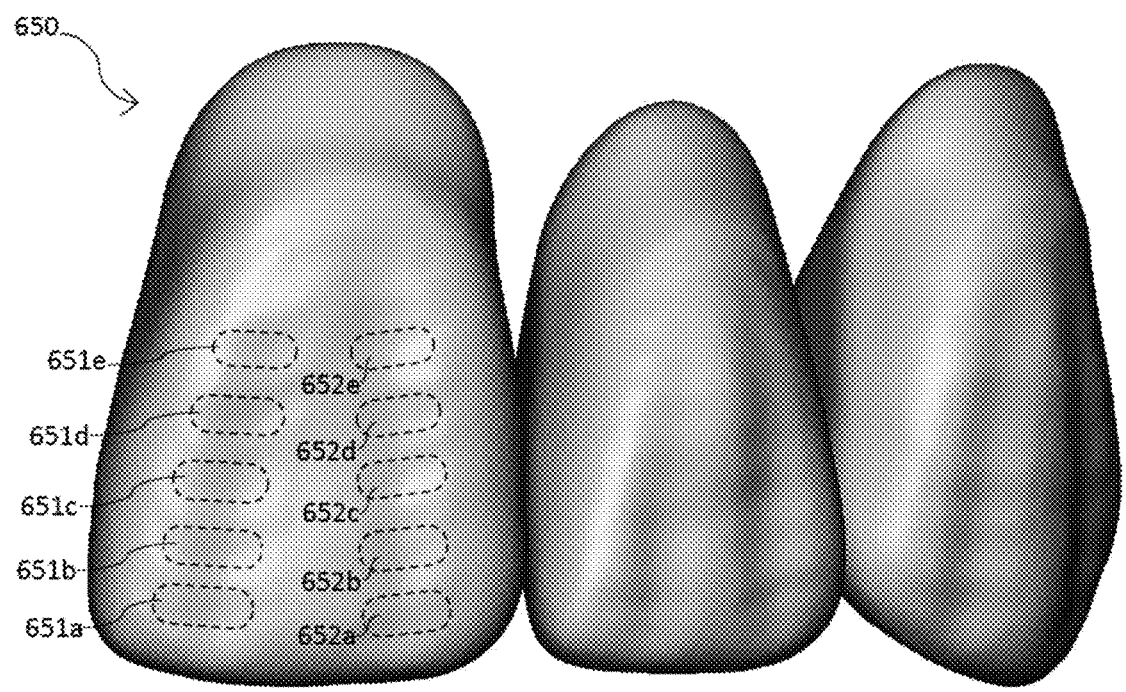
FIG. 6B provides an enlarged image of one of the central incisors, one of the lateral incisors, and one of the canines/cuspids associated with FIG. 6A to further show the additional surface variation incorporated within each of the at least one first and the at least one second furrows ($F_1$ and $F_2$) of FIG. 6A.

Furthermore, in yet another embodiment, the surface area within each of the furrows may be featureless, textured, embossed, irregular, patterned, faceted, dimpled, furrowed, or any combinations thereof. FIG. 6A shows an example image (600) of another virtual three-dimensional (3D) model for a complete set of upper (maxillary) artificial anterior teeth, from the viewpoint of the labial-facing side, for an alternative variation of the FIG. 2A embodiment of the present disclosure. Here the surface area within each of the at least one first and the at least one second furrows ($F_1$ and $F_2$) has been further modified to incorporate additional surface variations, in the form of a plurality of mesiodistal-oriented furrows. FIG. 6B provides an enlarged image (650) of one of the central incisors, one of the lateral incisors, and one of the canines/cuspids associated with FIG. 6A to further show the additional surface variation incorporated within each of the at least one first and at least one second furrows ($F_1$ and $F_2$) of FIG. 6A. In FIG. 6B, by way of example for emphasis in viewing, a first plurality of mesiodistal-oriented furrows is outlined (651a-651e) within the first furrow of the central incisor, and a second plurality of mesiodistal-oriented furrows is outlined (652a-652e) within the second furrow of the central incisor.

Artificial Anterior Tooth Forms

An artificial anterior tooth (or a set of artificial anterior teeth comprising a plurality of artificial anterior teeth) of the present disclosure may be generated in a digital or virtual form, where the artificial anterior tooth (or set) may be a virtual three-dimensional (3D) model in a non-transitory computer-readable storage medium. In one aspect, a virtual 3D model of an artificial anterior tooth (or set) of the present disclosure may be generated by performing or obtaining high-resolution imaging or optical scanning of a physical artificial anterior tooth model comprising one or more embodiments of the present disclosure. Various known imaging or optical scanning systems and methods (e.g., laser optical scanners, computed tomography (CT) scanners) are available to obtain accurate 3D digital models of physical models and objects. In another aspect, a virtual 3D model of an artificial anterior tooth (or set) of the present disclosure may be generated by the steps of: (i) performing or obtaining high-resolution imaging or optical scanning of a physical artificial anterior tooth model, where one or more embodiments of the present disclosure are initially absent or non-existent in the physical artificial tooth model, in order to generate a first virtual 3D model: and (ii) digitally manipulating and modifying geometry of the first virtual 3D model (using computer-aided design (CAD) software and methods/techniques known in the art) to create one or more embodiments of the present disclosure in a second virtual 3D model. In yet another aspect, a virtual 3D model of an artificial anterior tooth (or set) of the present disclosure may also be generated directly in CAD software using known methods/techniques, without performing or obtaining high-resolution imaging or optical scanning of a physical artificial anterior tooth as the starting basis.

In embodiments where the artificial anterior tooth (or set) is a virtual 3D model in a non-transitory computer-readable storage medium, the virtual 3D model may be used to further improve computer-aided design and/or computer-aided manufacture of an artificial anterior tooth, and/or set of artificial anterior teeth, for use in the design and/or production of a dental prosthesis (e.g., partial or full denture) and/or dental restoration (e.g., crown or bridge).

An artificial anterior tooth (or set) of the present disclosure may be generated in a physical form, where the artificial anterior tooth (or set) may be comprised of a polymeric composition, a composite resin composition, a ceramic composition, a glass-ceramic composition, or any combinations thereof. Without intending to be limiting, among the polymeric compositions, it may be preferable to use polymeric compositions comprised of combinations of various polymerizable acrylic and/or urethane-acrylic compounds that are photo-curable and/or heat-curable. These polymeric compositions may also comprise various additional materials, such as photopolymerization initiators and inhibitors, coloring agents (pigments, dyes), and resin-modifying particles (e.g., PMMA, core-shell impact modifiers) known in the art. Among the composite resin compositions, these may be comprised of any of the various known polymeric compositions combined with dispersed particles made of glass/silica, mineral(s), or ceramic. Among the ceramic compositions, those based on polycrystalline ceramics comprising an aluminum oxide and/or yttria-stabilized zirconium oxide matrix may be preferred. Among the glass-ceramic compositions, those based on lithium-aluminosilicates (LAS) and lithium disilicate glass ceramics (LDGC) may be preferred.

Regardless of the type of composition(s) selected for a given dental prosthesis or restoration application, optionally, it may be further advantageous to conduct additional post-processing handling or treatment to the anterior tooth (or set). This may include, for example, surface polishing to improve surface smoothness/finish, sintering or other heat treatment, and/or surface coating/sealing with a protective varnish or glazing composition to provide a final glossy and/or matte finish, and protect the tooth material against unwanted staining from food/drink.

Where an artificial anterior tooth (or set) is comprised of a polymeric composition, a composite resin composition, a ceramic composition, a glass-ceramic composition, or any combinations thereof, it may be preferable to provide a substantially uniform composition distribution throughout the artificial anterior tooth (or set). This may be advantageous or preferable, for example, to simplify manufacturing/formulating of the composition itself. Moreover, this may be advantageous or preferable to simplify further processing of the composition into the desired final artificial anterior tooth form(s), or to otherwise minimize complexity and/or costs of production. Alternatively, it may be preferable to provide a non-uniform composition distribution across at least a portion of the artificial anterior tooth (or set). More particularly, it may be preferable for the non-uniform composition distribution to be configured in a graduated or multi-layered formation or structure across at least a portion of the artificial anterior tooth (or set). This may be advantageous or preferable, for example, to create a more "premium" or high-grade appearance by providing additional natural-looking variation or gradation in the inherent optical properties, such as color and/or opacity/translucency, of the material distributed across the artificial anterior tooth (or set).

Figure 7A:
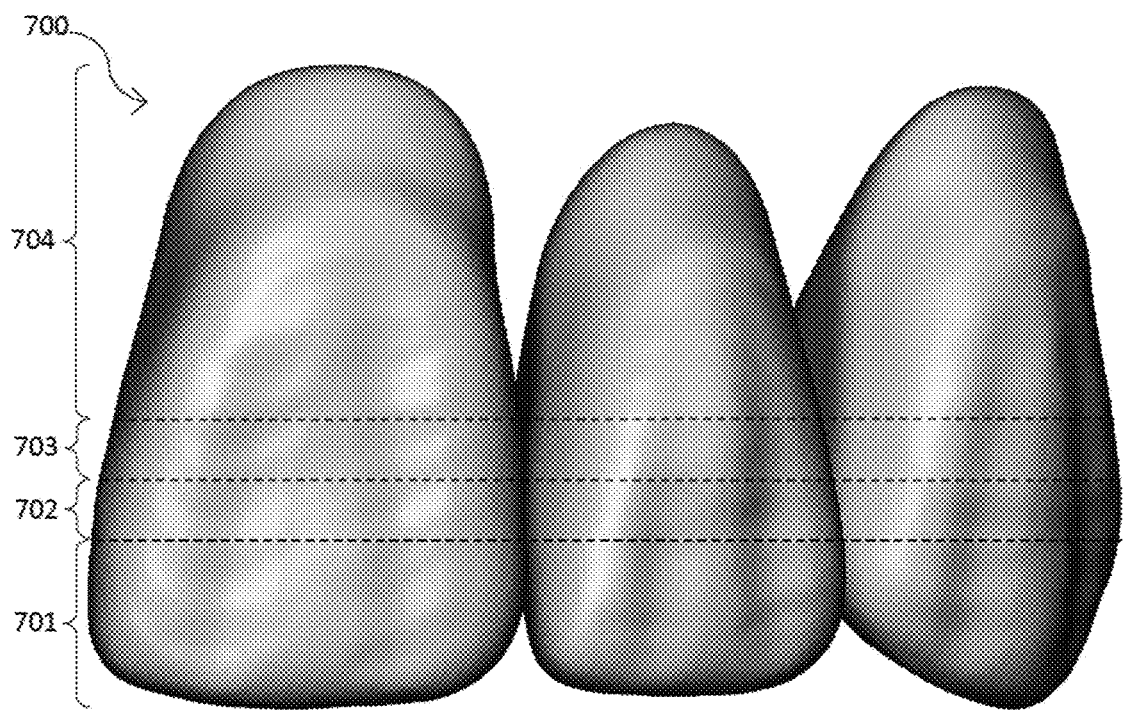
FIG. 7A provides an example image of a virtual three-dimensional (3D) model of a partial set of upper (maxillary) artificial anterior teeth, from the viewpoint of the labial-facing side, for an embodiment of the present disclosure, where a representation for a multi-layer structure of different compositions across each anterior tooth form is shown in a stacked configuration.
Figure 7B:
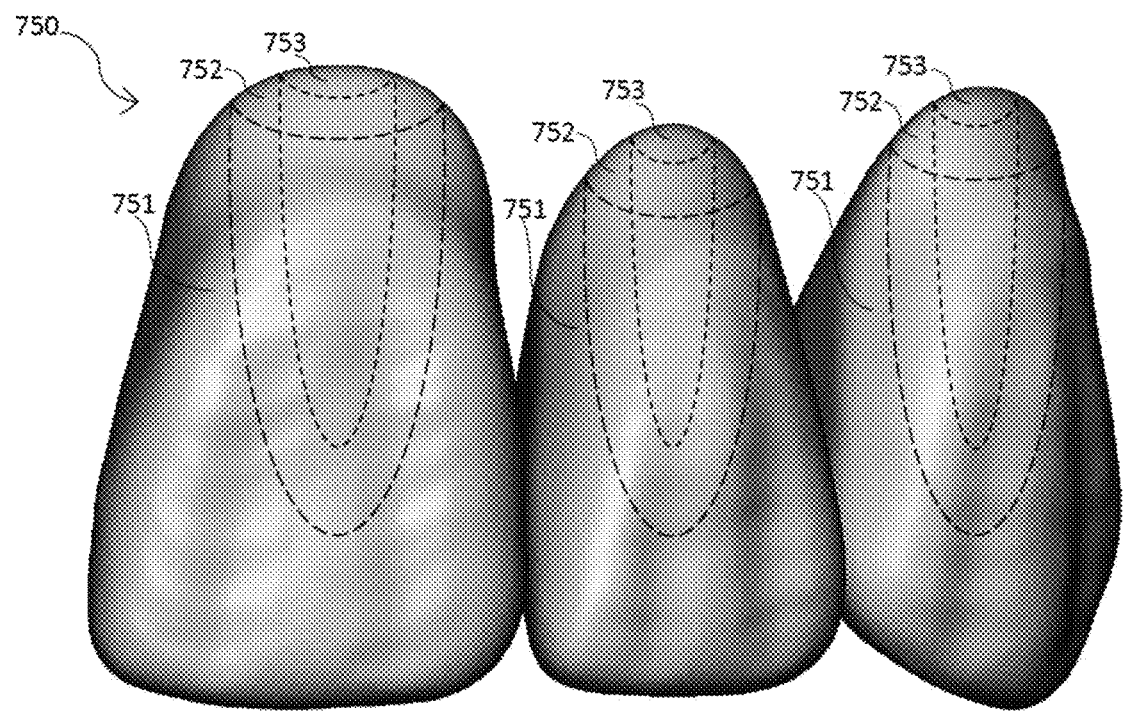
FIG. 7B provides an example image of a virtual three-dimensional (3D) model of a partial set of upper (maxillary) artificial anterior teeth, from the viewpoint of the labial-facing side, for an embodiment of the present disclosure, where a representation for an alternative multi-layer structure of different compositions across each anterior tooth form is shown in a nested configuration.

FIG. 7A provides an example image (700) of a virtual three-dimensional (3D) model of a partial set of upper (maxillary) artificial anterior teeth of the present disclosure, from the viewpoint of the labial-facing side, for an embodiment where a representation for a multi-layer structure (701-704) of different compositions across each anterior tooth form is shown in a stacked configuration in the cervico-incisal direction. In this configuration, for example, it may be preferable for the lower region (701) layer (which includes the incisal area of tooth) to be formed of compositions having less intense color and/or less opacity than that of the upper region (704) layer (which includes the cervical area of tooth), with optionally one or more intermediate layers (702, 703) in between aiding as a 'transition' layer of increasing color and/or opacity from the lower region (701) to the upper region (704). FIG. 7B provides an example image (750) of a virtual three-dimensional (3D) model of a partial set of upper (maxillary) artificial anterior teeth of the present disclosure, from the viewpoint of the labial-facing side, for an embodiment where a representation for an alternative multi-layer structure of different compositions across each anterior tooth form is shown in a nested configuration. In this configuration, for example, it may be preferable for the outer/exterior region (751) layer to be formed of compositions having less intense color and/or less opacity than that of the inner/core region (753) layer, with optionally one or more intermediate layers (752) in between aiding as a 'transition' layer of increasing color and/or opacity from the outer/exterior region (751) to the inner/core region (753). In one exemplary aspect, the non-uniform composition distribution may be configured such that for a 1.0±0.2 mm thickness sample of the artificial anterior tooth, $L^*_{(cervical)} < L^*_{(incisal)}$, where $L^*_{(cervical)}$ is a CIE (D65) lightness value measured proximate to, a cervical end of the artificial anterior tooth, and $L^*_{(incisal)}$ is a CIE (D65) lightness value measured proximate to an incisal end of the artificial anterior tooth. In another exemplary aspect, the non-uniform composition distribution may be configured such that for a 1.0±0.2 mm thickness sample of the artificial anterior tooth, % $T_{(cervical)} <$ % $T_{(incisal)}$ where % $T_{(cervical)}$ is a % Total Transmittance value measured proximate to a cervical end of the artificial anterior tooth, and % $T_{(incisal)}$ is a % Total Transmittance value measured proximate to an incisal end of the artificial anterior tooth.

Manufacturing systems or methods for an artificial anterior tooth (or set) of the present disclosure need not be limited, and may be produced by any manufacturing techniques or processes known in the art. For example, an artificial anterior tooth (or set) of the present disclosure may be produced by a molding manufacturing process, a casting manufacturing process, a subtractive manufacturing process, an additive or generative manufacturing process, or any combinations thereof. Subtractive manufacturing, and additive or generative manufacturing processes, may be particularly advantageous for improved accuracy and/or efficiency benefits.

Color and Opacity/Translucency

Color and opacity/translucency properties may be determined by various measurement systems and methods known in the art. Spectrophotometers such as the X-Rite® Color i7 benchtop spectrophotometer (available from X-Rite, Inc.), which is a reflectance/transmittance reference-level, dual beam sphere benchtop spectrophotometer, may be operated in Reflectance Measurement Mode to measure color values (e.g., CIELAB (D65) color space (L*, b* values), or CIELCh (D65) color space (L*, C*, h* values)) of samples, and operated in Transmission Measurement Mode to measure % Total Transmittance (% T) of samples. CIELAB space is three-dimensional, and covers the entire range of human color perception, or gamut. It is based on the opponent color model of human vision, where red and green form an opponent pair, and blue and yellow form an opponent pair. The lightness value, L", defines black at 0 and white at 100. The a* axis is relative to the green-red opponent colors, with negative values toward green and positive values toward red. The b* axis represents the blue-yellow opponents, with negative values toward blue and positive values toward yellow. The a* and b* axes are unbounded. For % T, high translucency (or low opacity) is indicated by values approaching 100% (i.e., transparent), while love translucency (or high opacity) is indicated by values approaching 0% (i.e., opaque),

EXAMPLES

Color and Translucency Characterization of Select Tooth Shades as a Function of Thickness in a Representative Photopolymerized Dental Resin Composition To evaluate the effect of changing material thickness on measured values of color and % Total Transmittance, sample plates of photopolymerizable colored dental resins were fabricated by an additive manufacturing process (i.e., DLP, or Digital Light Processing, on a CARBON® M1 or M2 printer (available from Carbon, Inc.). The colored dental resins were comprised of acrylic and urethane-acrylic compounds, photoinitiator, and various coloring agents to produce five distinct representative tooth shades (A3.5, B1, BL1, B2, and C3). Sample plates were made to have a diameter of about 50 mm, and were printed in different nominal thicknesses of 1 mm, 2 mm, 3 mm, 4 mm, and 5 mm. A total of 4 sample plates per thickness were printed using a layer or slice thickness of 50 microns. Following removal of printed sample plates from printer, plates were placed in glass containers having isopropanol (99%) to submerge each specimen. With lid secured to container, they were placed in ultrasonic water bath for an initial cleaning/wash cycle. An initial ultrasonic cleaning cycle of two minutes was performed, followed by removal of isopropanol from container and refilling container with fresh isopropanol to complete an additional one-minute ultrasonic cleaning cycle. Cleaned sample plates were removed from containers and dried with compressed air before proceeding to a secondary curing process in an INLAB SPEEDCURE™ Processing Unit (Model No. 9494800; 120 Volts, 12 Amps, 1200 Watts; available from Dentsply Sirona, Inc.). Cleaned sample plates were further cured for 10 minutes on each of the two largest sides of the sample to further ensure complete resin curing. Sample plates were sanded with 600 grit sandpaper to +/−0.2 mm from the target thickness, then pumiced (HENRY SCHEIN® Laboratory Pumice Coarse Grain) and polished on a finishing wheel. Sample plates were then washed with tap water, and dried, on paper towels at ambient temperature.

Prepared sample plates were measured on an X-Rite® Color i7 benchtop spectrophotometer (available from X-Rite, Inc.) using Color iControl software. Each sample plate was measured in Reflectance Measurement Mode two (2) times to evaluate color values. Each sample plate was then placed against the spherical transmittance port and measured in Transmission Measurement Mode two (2) times to evaluate % Total Transmittance (% T).

TABLE 1

Color and % Total Transmittance Evaluations for A3.5 Tooth Shade

| Plate Sample Thickness (Nominal) | L* (avg. of n = 4 plates) | a* (avg. of n = 4 plates) | b* (avg. of n = 4 plates) | C* $[=(a^{*2} + b^{*2})^{1/2}]$ | % T (avg. of n = 4 plates) |
|---|---|---|---|---|---|
| 1 mm | 84.34 | 3.12 | 22.86 | 23.07 | 62.1% |
| 2 mm | 77.28 | 5.65 | 26.52 | 27.11 | 43.4% |
| 3 mm | 72.10 | 7.04 | 25.06 | 26.03 | 29.9% |
| 4 mm | 69.59 | 7.16 | 22.73 | 23.82 | 21.8% |
| 5 mm | 68.46 | 6.76 | 20.98 | 22.04 | 16.5% |

TABLE 2

Color and % Total Transmittance Evaluations for B1 Tooth Shade

| Plate Sample Thickness (Nominal) | L* (avg. of n = 4 plates) | a* (avg. of n = 4 plates) | b* (avg. of n = 4 plates) | C* $[=(a^{*2} + b^{*2})^{1/2}]$ | % T (avg. of n = 4 plates) |
|---|---|---|---|---|---|
| 1 mm | 90.36 | −0.87 | 10.25 | 10.29 | 70.3% |
| 2 mm | 85.71 | −0.29 | 13.46 | 13.47 | 52.6% |
| 3 mm | 81.71 | 0.52 | 14.18 | 14.19 | 40.2% |
| 4 mm | 79.42 | 1.21 | 14.20 | 14.25 | 31.2% |
| 5 mm | 77.18 | 1.41 | 13.64 | 13.72 | 25.2% |

TABLE 3

Color and % Total Transmittance Evaluations for BL1 Tooth Shade

| Plate Sample Thickness (Nominal) | L* (avg. of n = 4 plates) | a* (avg. of n = 4 plates) | b* (avg. of n = 4 plates) | C* $[=(a^{*2} + b^{*2})^{1/2}]$ | % T (avg. of n = 4 plates) |
|---|---|---|---|---|---|
| 1 mm | 92.22 | −2.31 | 5.37 | 5.84 | 63.0% |
| 2 mm | 91.11 | −2.85 | 5.57 | 6.25 | 46.8% |
| 3 mm | 88.84 | −2.79 | 5.12 | 5.83 | 35.3% |
| 4 mm | 86.97 | −2.64 | 4.87 | 5.54 | 26.4% |
| 5 mm | 85.57 | −2.56 | 5.04 | 5.65 | 19.8% |

TABLE 4

Color and % Total Transmittance Evaluations for B2 Tooth Shade

| Plate Sample Thickness (Nominal) | L* (avg. of n = 4 plates) | a* (avg. of n = 4 plates) | b* (avg. of n = 4 plates) | C* [=(a*² + b*²)^(1/2)] | % T (avg. of n = 4 plates) |
|---|---|---|---|---|---|
| 1 mm | 88.85 | 0.31 | 16.00 | 16.00 | 66.6% |
| 2 mm | 82.44 | 1.01 | 19.29 | 19.32 | 47.9% |
| 3 mm | 78.63 | 2.45 | 19.83 | 19.98 | 35.4% |
| 4 mm | 76.35 | 3.04 | 19.05 | 19.29 | 27.0% |
| 5 mm | 75.44 | 3.23 | 17.62 | 17.91 | 20.3% |

TABLE 5

Color and % Total Transmittance Evaluations for C3 Tooth Shade

| Plate Sample Thickness (Nominal) | L* (avg. of n = 4 plates) | a* (avg. of n = 4 plates) | b* (avg. of n = 4 plates) | C* [=(a*² + b*²)^(1/2)] | % T (avg. of n = 4 plates) |
|---|---|---|---|---|---|
| 1 mm | 83.08 | 2.50 | 19.56 | 19.72 | 61.9% |
| 2 mm | 73.84 | 4.75 | 22.57 | 23.07 | 37.7% |
| 3 mm | 69.25 | 5.01 | 20.30 | 20.91 | 25.4% |
| 4 mm | 66.70 | 4.68 | 18.29 | 18.88 | 17.3% |
| 5 mm | 65.62 | 4.09 | 16.76 | 17.25 | 11.8% |

Figure 8A:
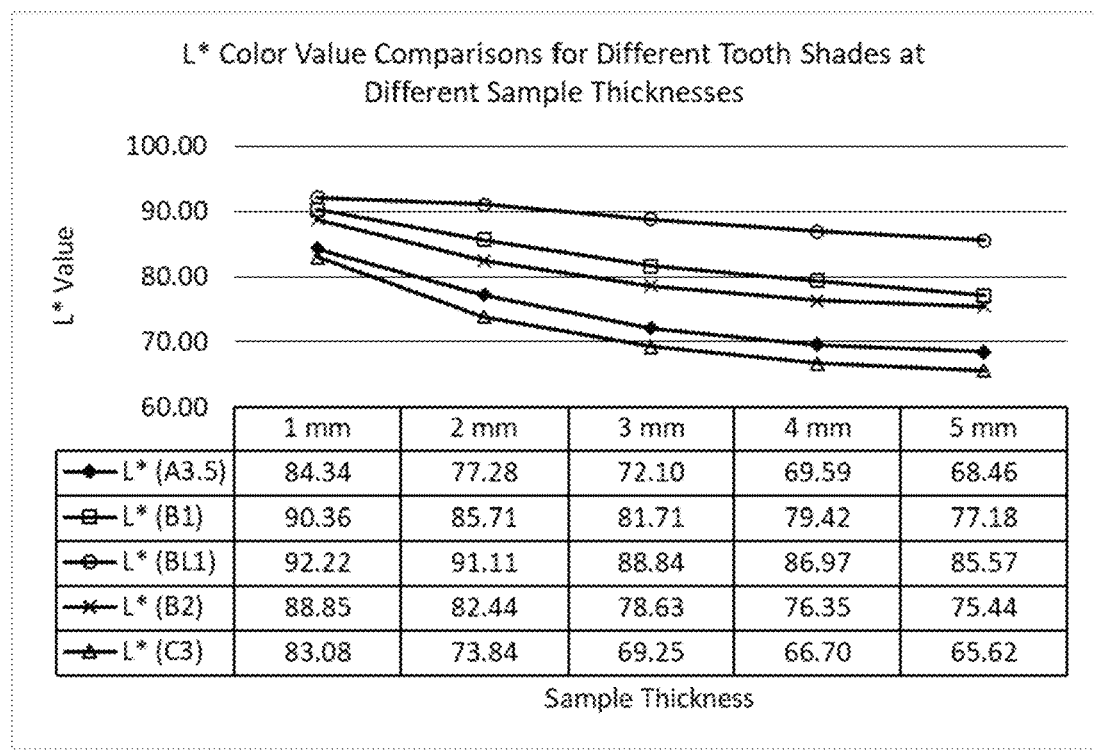
FIG. 8A provides a chart displaying comparisons of CIE L* color values for several different representative tooth shades at different sample thicknesses.
Figure 8B:
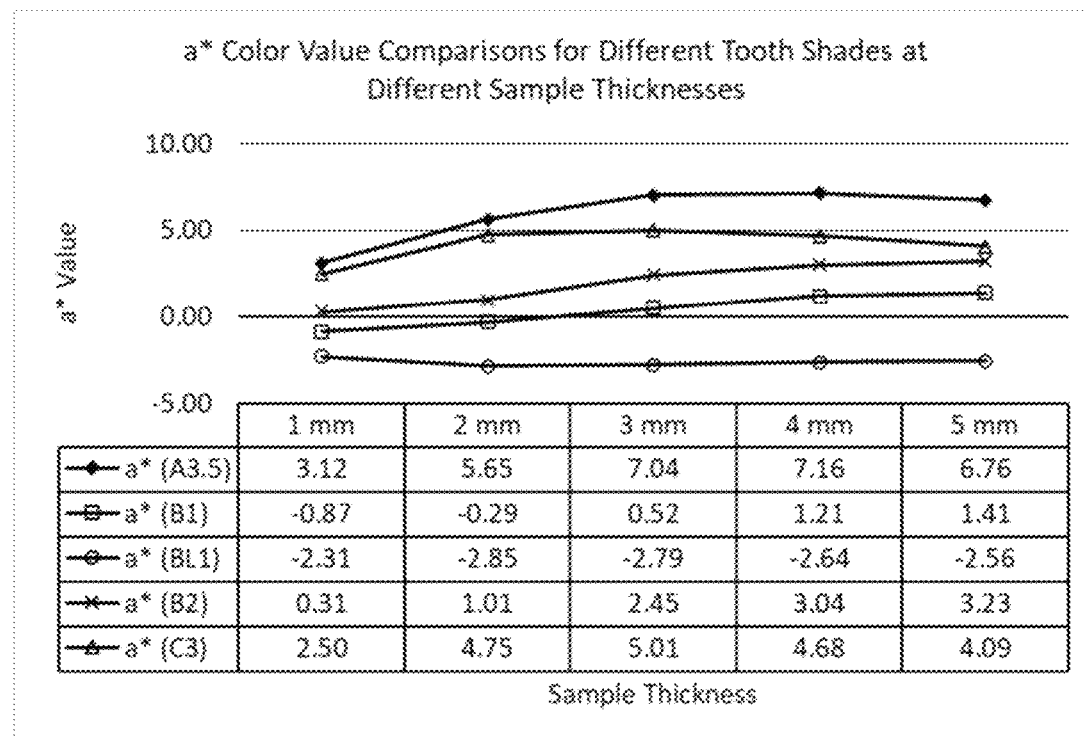
FIG. 8B provides a chart displaying comparisons of CIE a* color values for several different representative tooth shades at different sample thicknesses.
Figure 8C:
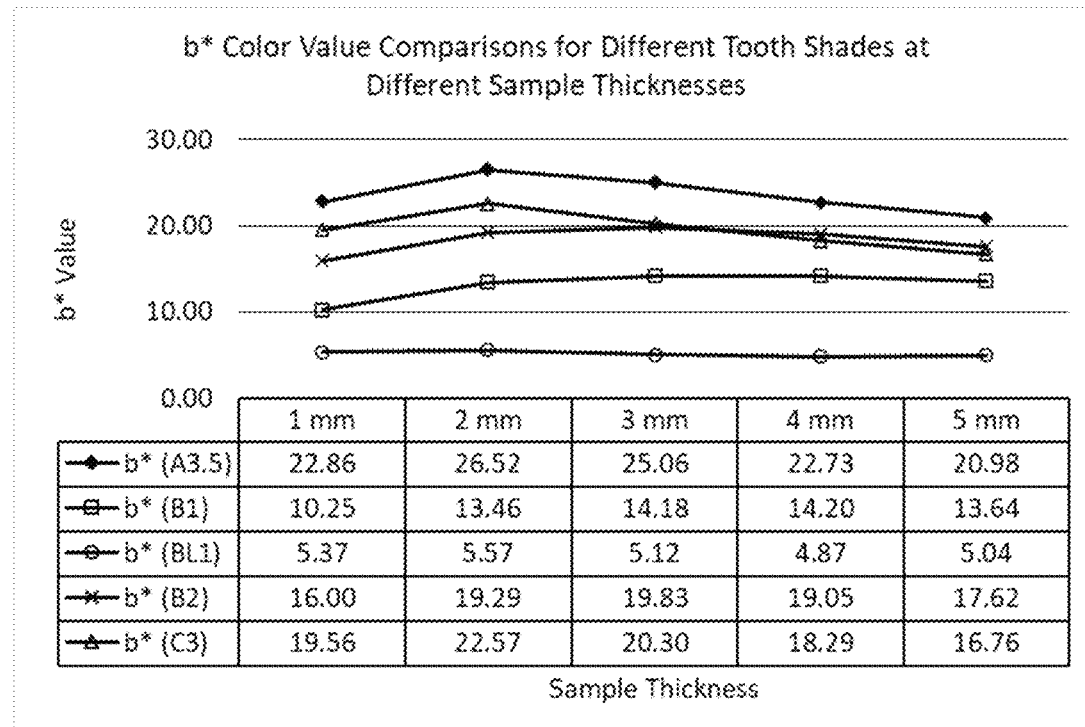
FIG. 8C provides a chart displaying comparisons of CIE b* color values for several different representative tooth shades at different sample thicknesses.

FIG. 8A-8C charts have also been provided to further aid in visualizing the distinct varying natures of color value (L*, a*, and b* value) changes for these different tooth shades as a function of different sample thicknesses. Quite surprisingly, both the a* values (green-red opponent colors) and b* values (blue-yellow opponent colors) can be seen to have varying combinations of increasing and decreasing color changes as the sample thickness changes.

Example 1

Provided below are comparisons of calculated estimates for color and % Total Transmittance value differences across a representative mesiodistal cross-sectional area (located approximately 2 mm distance from incisal end) for an incisor tooth, in conventional form vs. inventive form, in the A3.5 tooth shade.

| | Parameter | | | | | |
|---|---|---|---|---|---|---|
| | Incisor Tooth - Conventional Form | | | Incisor Tooth - Inventive Form | | |
| | $Th_{max}$ | $Th_{min}$ | $Th_{max}/Th_{min}$ | $Th_{max}$ | $Th_{min}$ | $Th_{max}/Th_{min}$ |
| Thickness | 2.7 mm | 2.6 mm | 1.04 | 2.7 mm | 2.0 mm | 1.35 |
| | | | Difference ($Th_{min} - Th_{max}$) | | | Difference ($Th_{min} - Th_{max}$) |
| L* (calc.) | 73.65 | 74.17 | 0.52 | 73.65 | 77.28 | 3.63 |
| a* (calc.) | 6.62 | 6.48 | −0.14 | 6.62 | 5.65 | −0.97 |
| b* (calc.) | 25.50 | 25.64 | 0.14 | 25.50 | 26.52 | 1.02 |
| C* (calc.) | 26.35 | 26.46 | 0.11 | 26.35 | 27.11 | 0.76 |
| % T (calc.) | 34.0% | 35.3% | 1.3% | 34.0% | 43.4% | 9.4% |

Example 2

Provided below are comparisons for calculated estimates of color and % Total Transmittance value differences across a representative mesiodistal cross-sectional area (located approximately 2 mm distance from incisal end) for an incisor tooth, in conventional form vs. inventive form, in the B1 tooth shade.

| | Parameter | | | | | |
|---|---|---|---|---|---|---|
| | Incisor Tooth - Conventional Form | | | Incisor Tooth - Inventive Form | | |
| | $Th_{max}$ | $Th_{min}$ | $Th_{max}/Th_{min}$ | $Th_{max}$ | $Th_{min}$ | $Th_{max}/Th_{min}$ |
| Thickness | 2.7 mm | 2.6 mm | 1.04 | 2.7 mm | 2.0 mm | 1.35 |
| | | | Difference ($Th_{min} - Th_{max}$) | | | Difference ($Th_{min} - Th_{max}$) |
| L* (calc.) | 82.91 | 83.31 | 0.40 | 82.91 | 85.71 | 2.80 |
| a* (calc.) | 0.28 | 0.20 | −0.08 | 0.28 | −0.29 | 0.57 |
| b* (calc.) | 13.96 | 13.89 | −0.07 | 13.96 | 13.46 | −0.50 |
| C* (calc.) | 13.97 | 13.90 | −0.07 | 13.97 | 13.47 | −0.50 |
| % T (calc.) | 43.9% | 45.2% | 1.3% | 43.9% | 52.6% | 8.7% |

Example 3

Provided below are comparisons for calculated estimates of color and % Total Transmittance value differences across a representative mesiodistal cross-sectional area (located approximately 2 mm distance from incisal end) for an incisor tooth, in conventional form vs. inventive form, in the B1 tooth shade.

| | Parameter | | | | | |
|---|---|---|---|---|---|---|
| | Incisor Tooth - Conventional Form | | | Incisor Tooth - Inventive Form | | |
| | $Th_{max}$ | $Th_{min}$ | $Th_{max}/Th_{min}$ | $Th_{max}$ | $Th_{min}$ | $Th_{max}/Th_{min}$ |
| Thickness | 2.7 mm | 2.6 mm | 1.04 | 2.7 mm | 2.0 mm | 1.35 |
| | | | Difference ($Th_{min} - Th_{max}$) | | | Difference ($Th_{min} - Th_{max}$) |
| L* (calc.) | 89.52 | 89.75 | 0.23 | 89.52 | 91.11 | 1.59 |
| a* (calc.) | −2.81 | −2.81 | 0.00 | −2.81 | −2.85 | −0.04 |
| b* (calc.) | 5.25 | 5.30 | 0.05 | 5.25 | 5.57 | 0.32 |
| C* (calc.) | 5.96 | 6.00 | 0.04 | 5.96 | 6.25 | 0.29 |
| % T (calc.) | 38.8% | 39.9% | 1.1% | 38.8% | 46.8% | 8.0% |

Example 4

Provided below are comparisons for calculated estimates of color and % Total Transmittance value differences across a representative mesiodistal cross-sectional area (located approximately 2 mm distance from incisal end) for an incisor tooth, in conventional form vs. inventive form, in the B2 tooth shade.

| | Parameter | | | | | |
|---|---|---|---|---|---|---|
| | Incisor Tooth - Conventional Form | | | Incisor Tooth - Inventive Form | | |
| | $Th_{max}$ | $Th_{min}$ | $Th_{max}/Th_{min}$ | $Th_{max}$ | $Th_{min}$ | $Th_{max}/Th_{min}$ |
| Thickness | 2.7 mm | 2.6 mm | 1.04 | 2.7 mm | 2.0 mm | 1.35 |
| | | | Difference ($Th_{min} - Th_{max}$) | | | Difference ($Th_{min} - Th_{max}$) |
| L* (calc.) | 79.76 | 80.14 | 0.38 | 79.76 | 82.44 | 2.68 |
| a* (calc.) | 2.02 | 1.87 | −0.15 | 2.02 | 1.01 | −1.01 |
| b* (calc.) | 19.67 | 19.61 | −0.06 | 19.67 | 19.29 | −0.38 |
| C* (calc.) | 19.78 | 19.72 | −0.06 | 19.78 | 19.32 | −0.46 |
| % T (calc.) | 39.2% | 40.4% | 0.8% | 39.2% | 47.9% | 8.7% |

Example 5

Provided below are comparisons for calculated estimates of color and % Total Transmittance value differences across a representative mesiodistal cross-sectional area (located approximately 2 mm distance from incisal end) for an incisor tooth, in conventional form vs. inventive form, in the C3 tooth shade.

| | Parameter | | | | | |
|---|---|---|---|---|---|---|
| | Incisor Tooth - Conventional Form | | | Incisor Tooth - Inventive Form | | |
| | $Th_{max}$ | $Th_{min}$ | $Th_{max}/Th_{min}$ | $Th_{max}$ | $Th_{min}$ | $Th_{max}/Th_{min}$ |
| Thickness | 2.7 mm | 2.6 mm | 1.04 | 2.7 mm | 2.0 mm | 1.35 |
| | | | Difference ($Th_{min} - Th_{max}$) | | | Difference ($Th_{min} - Th_{max}$) |
| L* (calc.) | 70.63 | 71.09 | 0.46 | 70.63 | 73.84 | 3.21 |
| a* (calc.) | 4.93 | 4.91 | −0.02 | 4.93 | 4.75 | −0.18 |
| b* (calc.) | 20.98 | 21.21 | 0.23 | 20.98 | 22.57 | 1.59 |
| C* (calc.) | 21.56 | 21.77 | 0.21 | 21.56 | 23.07 | 2.14 |
| % T (calc.) | 29.1% | 30.3% | 1.2% | 29.1% | 37.7% | 8.6% |

From the examples provided above, while the color (L*, a*, b*, C*) and % T values across a conventional incisor tooth remain very uniform with only minor variation, in comparison, an incisor tooth of the present disclosure may be formed to achieve the desired objective of imparting more naturalistic, lifelike color and translucency variations and differences across the tooth. Without intending to be limiting, it may be particularly advantageous for an anterior tooth of the present disclosure to have an 12 color value change (i.e., between $Th_{min}$ and $Th_{max}$) of at least about 1.5 units, or at least about 2.0 units. In another aspect, it may be particularly advantageous for an anterior tooth of the present disclosure to have an a* color value change and/or b* color value change (i.e., between $Th_{min}$ and $Th_{max}$) of at least about 0.25 units, or at least about 0.50 units. In another aspect, it may be particularly advantageous for an anterior tooth of the present disclosure to have a % T value change (i.e., between $Th_{min}$ and $Th_{max}$) of at least about 5%, or at least about 7%.

It should be understood that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example only of a generic series of equivalent or similar features.

What is claimed is:

1. An artificial anterior tooth comprising:
    (a) a labial-facing surface having at least one first furrow ($F_1$), disposed left of a mid-sagittal plane of the labial-facing surface, and at least one second furrow ($F_2$), disposed right of the mid-sagittal plane of the labial-facing surface, where each of the at least one first and the at least one second furrows ($F_1$ and $F_2$) extend across at least a portion of a clinical crown on the labial-facing surface in a cervico-incisal direction; and
    (b) a lingual-facing surface having at least one third furrow ($F_3$), disposed left of the mid-sagittal plane of the lingual-facing surface, and at least one fourth furrow ($F_4$), disposed right of the mid-sagittal plane of the lingual-facing surface, where each of the at least one third and the at least one fourth furrows ($F_3$ and $F_4$) extend across at least a portion of the clinical crown on the lingual-facing surface in the cervico-incisal direction;
wherein:
    a location of at least one of the at least one third furrow (F3) across a mesiodistal direction on the lingual-facing surface substantially corresponds with a location of at least one of the at least one first furrow ($F_1$) across the mesiodistal direction on the labial-facing surface; and a location of at least one of the at least one fourth furrow ($F_4$) across the mesiodistal direction on the lingual-facing surface substantially corresponds with a location of at least one of the at least one second furrow ($F_2$) across the mesiodistal direction on the labial-facing surface;
    wherein a ratio of depths of the third and fourth furrows ($F_3$, and $F_4$) to the depths of the first and second furrows ($F_1$ and $F_2$) is between 1.25 and 4.00.

2. The artificial anterior tooth of claim 1, wherein each of the at least one first and the at least one second furrows ($F_1$ and $F_2$) extend across at least about 20 percent of the clinical crown on the labial-facing surface in the cervico-incisal direction, proximate to an incisal end.

3. The artificial anterior tooth of claim 1, wherein each of the at least one third and the at least one fourth furrows ($F_3$ and $F_4$) extend across at least about 20 percent of the clinical crown on the lingual-facing surface in the cervico-incisal direction, proximate to an incisal end.

4. The artificial anterior tooth of claim 1, wherein, for the portion of the labial-facing surface and the portion of the lingual-facing surface over which each of the furrows extend, at least one mesiodistal cross-sectional area of the artificial anterior tooth has both:
    i. an overall maximal thickness dimension ($Th_{max}$); and
    ii. a plurality of reduced thickness sections each having a minimal thickness dimension ($Th_{min}$), corresponding to the mesiodistal locations of the furrows;
    where a ratio of the overall maximal thickness dimension to the minimal thickness dimension ($Th_{max}/Th_{min}$) is at least about 1.15, and no more than about 2.50.

5. The artificial anterior tooth of claim 1, wherein an average maximal width of each of the furrows ($FW_{max}$) is at least about 5 percent, and no more than about 40 percent, of an artificial anterior tooth maximal width ($W_{max}$).

6. The artificial anterior tooth of claim 1, wherein a mesiodistal cross-sectional contour of each of the at least one first, the at least one second, the at least one third and the at least one forth furrows is rounded, curvilinear, free-form, squared, sloped, multi-faceted, or any combinations thereof.

7. The artificial anterior tooth of claim 1, wherein a surface area within each of the at least one first, the at least one second, the at least one third and the at least one forth furrows is featureless, textured, embossed, irregular, patterned, faceted, dimpled, furrowed, or any combinations thereof.

8. The artificial anterior tooth of claim 1, wherein the artificial anterior tooth is in the form of a virtual three-dimensional (3D) model in a non-transitory computer-readable storage medium.

9. The artificial anterior tooth of claim 1, wherein the artificial anterior tooth is comprised of a polymeric composition, a composite resin composition, a ceramic composition, a glass-ceramic composition, or any combinations thereof.

10. The artificial anterior tooth of claim 9, wherein the polymeric composition, the composite resin composition, the ceramic composition, the glass-ceramic composition, or any combinations thereof has a substantially uniform composition distribution throughout the artificial anterior tooth.

11. The artificial anterior tooth of claim 9, wherein the polymeric composition, the composite resin composition, the ceramic composition, the glass-ceramic composition, or any combinations thereof has a non-uniform composition distribution across at least a portion of the artificial anterior tooth.

12. The artificial anterior tooth of claim 11, wherein the non-uniform composition distribution is configured in a graduated or multi-layered formation across at least a portion of the artificial anterior tooth.

13. The artificial anterior tooth of claim 12, wherein the graduated or multi-layered formation is provided in a stacked configuration in the cervico-incisal direction.

14. The artificial anterior tooth of claim 12, wherein the graduated or multi-layered formation is provided in a nested configuration in the cervico-incisal direction.

15. The artificial anterior tooth of claim 11, wherein the non-uniform composition distribution is configured such that for a 1.0±0.2 mm thickness sample of the artificial anterior tooth, $L^*_{(cervical)} < L^*_{(incisal)}$, where $L^*_{(cervical)}$ is a CIE (D65) lightness value measured proximate to a cervical end of the artificial anterior tooth, and $L^*$(incisal) is a CIE (D65) lightness value measured proximate to an incisal end of the artificial anterior tooth.

16. The artificial anterior tooth of claim 11, wherein the non-uniform composition distribution is configured such that for a 1.0±0.2 mm thickness sample of the artificial anterior tooth, $\% T_{(cervical)} < \% T_{(incisal)}$, where $\% T_{(cervical)}$ is a % Total Transmittance value measured proximate to a cervical end of the artificial anterior tooth, and $\% T_{(incisal)}$ is a % Total Transmittance value measured proximate to an incisal end of the artificial anterior tooth.

17. The artificial anterior tooth of claim 1, wherein the artificial anterior tooth is produced by a molding manufacturing process, a casting manufacturing process, a subtractive manufacturing process, an additive or generative manufacturing process, or any combinations thereof.

18. A set of artificial anterior teeth, comprising a plurality of artificial anterior teeth as set forth in claim 1.

* * * * *